Figure 1:
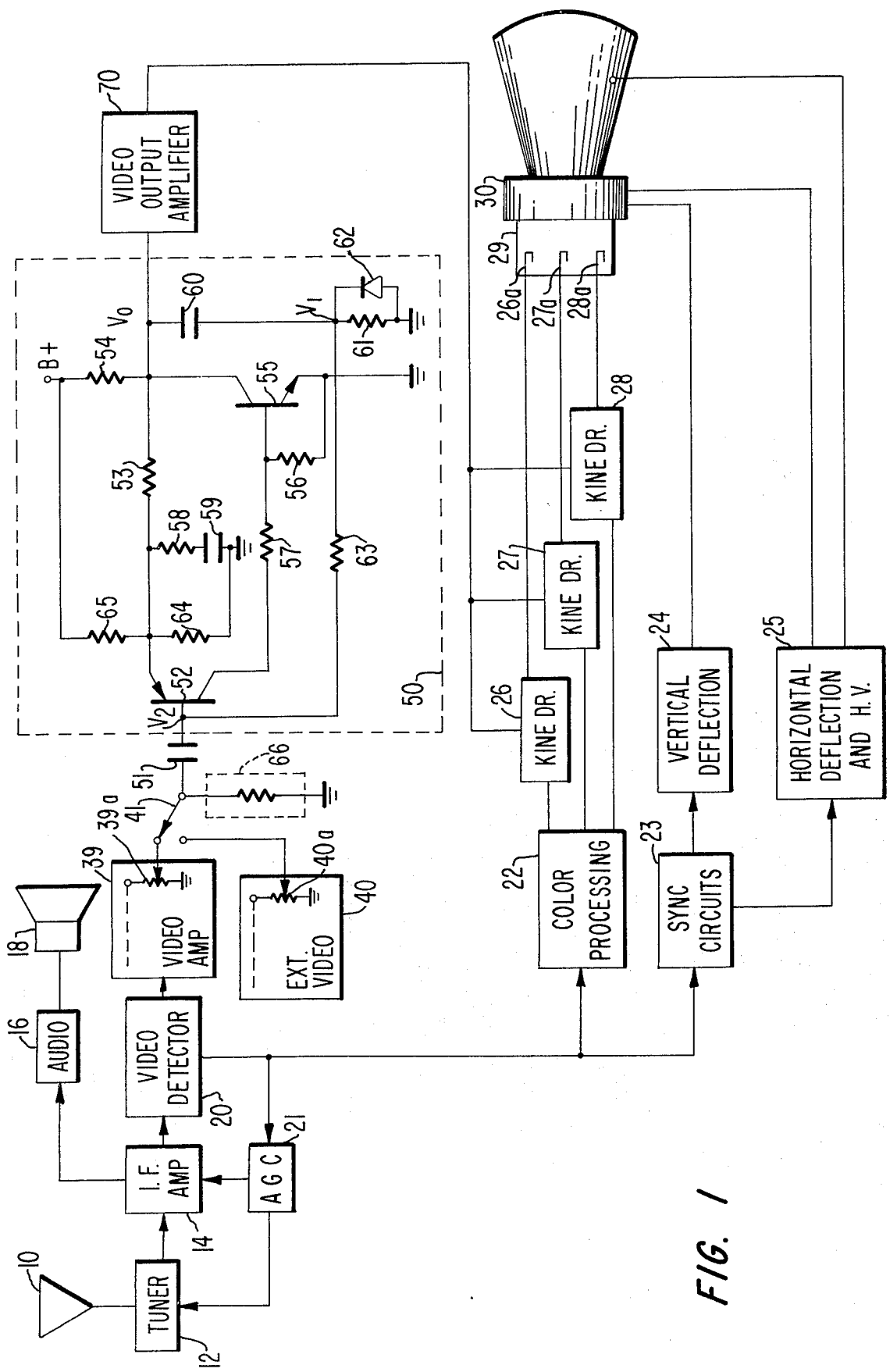

United States Patent [19]

Willis

[11] 3,955,047
[45] May 4, 1976

[54] D.C. REINSERTION IN VIDEO AMPLIFIER

[75] Inventor: Donald Henry Willis, Indianapolis, Ind.

[73] Assignee: RCA Corporation, New York, N.Y.

[22] Filed: Oct. 1, 1974

[21] Appl. No.: 511,311

[30] Foreign Application Priority Data

Apr. 16, 1974 United Kingdom............... 16653/74

[52] U.S. Cl. .................. 178/7.3 DC; 178/DIG. 26; 330/28; 330/100; 358/39
[51] Int. Cl.² ...................... H04N 5/16; H03F 1/34
[58] Field of Search................. 178/7.3 DC, 7.5 DC, 178/DIG. 26; 330/11, 28, 104, 98–100, 103; 358/39

[56] References Cited
UNITED STATES PATENTS 2,629,025   2/1953   Roberts................................ 330/99
2,708,687   5/1955   Schlesinger ................... 178/7.3 DC
3,315,033   4/1967   Sennhenn et al............. 178/7.3 DC
3,750,038   7/1973   Meise et al. ........................... 330/11

Primary Examiner—George H. Libman
Attorney, Agent, or Firm—Eugene M. Whitacre

[57] ABSTRACT

An amplifier for processing television signals containing video information and related synchronizing components. An output feedback clamp circuit clamps a portion of the signal (e.g., the synchronizing components) to a point of reference potential and provides a D.C. voltage determined by the D.C. content of the video signal relative to the sync components. The amplifier is arranged to provide a predetermined D.C. gain (e.g., unity). The derived D.C. voltage is fed back to the amplifier input to reinsert a D.C. component which is processed through the amplifier in conjunction with the video signal and provides the necessary input to the clamp circuit.

11 Claims, 6 Drawing Figures

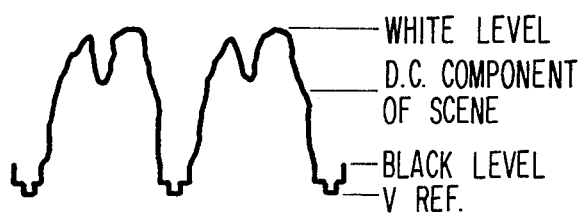
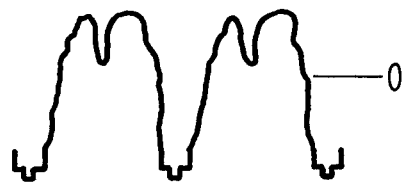
FIG. 2A
FIG. 2B
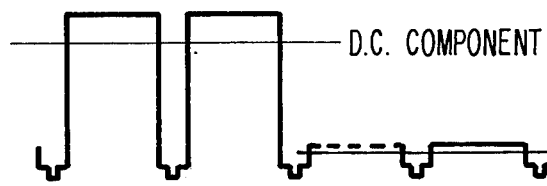
FIG. 3A
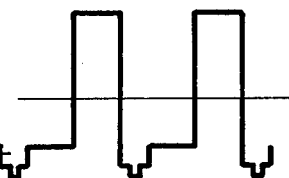
FIG. 3B
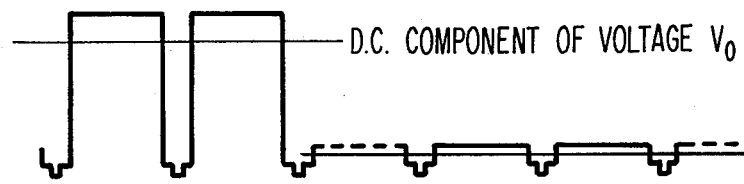
FIG. 3C

D.C. REINSERTION IN VIDEO AMPLIFIER

This invention relates to circuit arrangements for translating electric wave energy in the form of video information signals such as are found in present television practice, and it particularly pertains to circuitry for inserting direct current components of the video information where these direct current components have been lost or otherwise distorted in preceding signal processing circuits.

In present television broadcasting practice, the image of a scene to be televised is projected onto a suitable pickup device which develops electric wave signals representative of the light values of elemental areas of the image when the pickup device is scanned.

In accordance with existing standards, the scanning in the receiving apparatus is synchronized with that of the transmitting apparatus by the transmission of line and field rate synchronizing pulses which are superimposed on blanking pedestals during recurring scanning retrace intervals. The blanking pedestals (as illustrated in FIG. 2a) are ordinarily established at a predetermined picture signal level corresponding to blacker-than-black, which, at the receiver, is usually made to be at or slightly beyond cutoff of the image reproducing device, or kinescope.

The composite signals which are representative of the scene, including the reference black level, are operated upon in signal processing circuits which may include alternating current (A.C.) coupling means for translating the signal to the image reproducing device. Since the image light values are relative to a given background brightness level represented by the direct current component of the signal, it is necessary that the composite signal be referred to that reference level at certain points in the overall transmission and receiving systems. Where such points are preceded by an A.C. coupling device, for example a capacitor or transformer, the direct current component is modified or lost, as illustrated in FIG. 2b, and should be effectively restored for best image reproduction. An excellent discussion of the problem of D.C. reinsertion, definition of terms and analysis of various suggested forms of D.C. reinserting circuits are contained in an article entitled, "Television D.C. Component," by Karl R. Wendt, commencing on page 85 of the March 1948 issue of the *RCA Review*.

A signal translating circuit which embodies the present invention utilizes a video amplifier having at least one amplifier stage with an input and output terminal and a predetermined D.C. signal gain. A source of video information signals containing synchronizing components is coupled to the input terminal. Clamping means comprising a capacitor and a rectifier are coupled to the output terminal and generate a D.C. voltage determined by the D.C. content of the video information relative to the synchronizing components. Feedback means coupled from the junction of the capacitor and rectifier to the input terminal provide in the video signal at the output terminal a D.C. voltage component related to the D.C. content of the video information.

The present invention will be better understood from the following text and accompanying drawing, in which:

FIG. 1 illustrates in a functional block and partial schematic form a portion of a color television receiver including the present invention;

FIGS. 2a, and 2b are graphical representations of a typical video signal waveform; and FIGS. 3a, and 3b are graphical representations of waveforms appearing at selected circuit points during the operation of the circuit arrangement of FIG. 1.

Referring to FIG. 1, an antenna 10 receives composite television signals and couples these signals to a tuner 12 which selects the desired radio frequency signals of a predetermined boradcast channel, amplifies these signals and converts the amplified radio signals to a lower intermediate frequency (I.F.) signal. The output of tuner 12 is coupled to an I.F. amplifier 14 which amplifies the I.F. signals. The I.F. amplifier 14 supplies signals to an audio processing circuit 16 which detects audio information, amplifies it and couples the resultant audio frequencies to a speaker 18 to reproduce the audio portion of the transmitted television program.

Another output of I.F. amplifier 14 is coupled to a video detector 20 which derives luminance, chrominance and synchronizing information from the I.F. signals. The output of video detector 20 is coupled to a video amplifier 39. The output of video amplifier 39 is coupled to a video output amplifier 70 via a video processing stage 50. Outputs from the video detector 20 are also coupled to an automatic gain control (A.G.C.) stage 21, a sync separator stage 23, and a color processing stage (chrominance) 22. Luminance signals from the video output amplifier 70 are combined with chrominance signals from color processing stage 22 in kinescope drivers 26,27,28 to control elements such as cathodes 26a,27a,28a of kinescope 29.

Sync separator stage 23 is coupled to a vertical deflection stage 24 and to a horizontal deflection stage 25, the latter typically including means for developing a high voltage accelerating potential for operation of kinescope 29. Output deflection signals are coupled from vertical deflection stage 24 and horizontal deflection stage 25 to corresponding vertical and horizontal deflection coils of deflection yoke 30. Also included but not illustrated are the various operating potentials for the receiver stages which may be derived from a power supply in a manner well known to those skilled in the art.

The television receiver as illustrated in FIG. 1 and described above also contains a video processing stage 50. A switch 41 may be positioned to select either the amplified detected video output of the detector 20 from video amplifier 39 or an external source of video signals, such as a video tape recorder, identified generally as 40. Video amplifier 39 and external video source 40 are shown with output attenuators 39a and 40a, respectively, which may be used to properly select or match the input signal level to video processing stage 50 when either source of video signal is selected by switch 41. Switch 41 also provides switching functions (not shown) which further condition the receiver to operate from an external video source, for example, inputs for color processing (22) and sync separator stage 23 are normally derived from the external video source when such a source is coupled into the receiver via switch 41.

Video processing stage 50 comprises transistors 52 and 55, each having emitter, base and collector electrodes. The base of transistor 52 receives the detected video signal from the output of video amplifier 39 (switch 41 in the internal mode position) through a coupling capacitor 51. The collector of transistor 52 is coupled to the base of transistor 55 by a resistor 57.

The emitter of transistor 52 is coupled to the collector of transistor 55 by a resistor 53. The base of transistor 55 is coupled to a point of reference potential, such as ground, by a resistor 56. The collector of transistor 55 is coupled to a source of operating voltage (B+) by a resistor 54. One terminal of capacitor 60 is direct coupled to the collector of transistor 55 which serves as an output terminal. The other terminal of capacitor 60 is coupled to a first terminal of a parallel network comprising a resistor 61 and a diode 62. The other terminal of the parallel network is coupled to a point of reference potential, such as ground.

A voltage $V_1$ developed at the junction of capacitor 60 and the first terminal of the parallel network 61,62 is coupled to the base of transistor 52 by a resistor 63.

A frequency selective network comprising the series combination of a resistor 58 and a capacitor 59 is coupled from the emitter of transistor 52 to a point of reference potential, such as ground.

A bias network comprising resistors 64 and 65 is coupled between a source of operating voltage (B+) and a point of reference potential such as ground. The junction of resistors 64 and 65 is coupled to the emitter of transistor 52.

In operation, the detected video output from video amplifier 39, or external source 40, as determined by the position of selector switch 41, is coupled to video processing stage 50 by capacitor 51. Transistors 52 and 55 form an amplifier with negative feedback from the collector of transistor 55 to the emitter of transistor 52. The detected video signal passes through two inversions, thus resulting in a non-inverted signal $V_0$ at the amplifier output terminal. The amplifier 50 is arranged to produce a high open loop signal voltage gain, thereby ensuring that the closed loop signal voltage gain is determined by the feedback network comprising resistors 53,58,64,65 and capacitor 59.

The principles of the invention can best be understood by a separate consideration of the A.C. and D.C. signal translation in video processing stage 50. In the range of video frequencies of interest (e.g., 60 Hz to 4 MHz—the A.C. component of the base band composite video signal) capacitors 51 and 59 may be considered as short circuits for A.C. signals. Thus, with bias resistors 64 and 65 of relatively high resistance value, the A.C. voltage gain of video processing stage 50 is determined substantially by the ratio of resistors 53 and 58. That is, the A.C. voltage gain is approximately the inverse of the voltage division of resistors 53 and 58 for A.C. signals:

$$\text{A.C. gain} \approx \frac{R53+R58}{(R58)}$$

Because capacitor 59 is an effective open circuit (high impedance) for D.C., substantially all of the D.C. voltage developed at the output terminal is fed back to the emitter of transistor 52. The D. C. gain of video processing stage 50 is therefore approximately unity. The D.C. component of the output signal $V_0$ follows whatever the D.C. component of the voltage $V_2$ is except for the addition of a positive offset determined by the $V_{be}$ of transistors 52 and 55 and the relative magnitudes of resistors 53 and 56, as will appear below. The D.C. component of the voltage $V_2$ at the base of transistor 52 is supplied by the clamp circuit comprising resistor 61, diode 62 and capacitor 60 which is coupled to the collector of output transistor 55. As will be explained below in connection with FIG. 3, the clamp circuit clamps the synchronizing component of the amplified video signal at the cathode of diode 62 to a level slightly below a reference level (i.e., ground as shown in the illustrated embodiment) by an amount equal to the forward bias conduction voltage of diode 62. The voltage $V_1$ therefore contains a D.C. component which is appropriate for the signal developed at the cathode of diode 62 and at the output of the amplifier to have substantially grounded sync tips for that particular scene content. This D.C. component of the signal $V_1$ is coupled to the base of transistor 52 by means of a resistor 63 with substantially no loss due to the relatively high D.C. input impedance of transistor 52. The resultant D.C. component of voltage $V_2$ is then "amplified" with a gain of substantially unity and appears at the output terminal with the aforementioned offset. Thus, the video signal $V_0$ at the amplifier output terminal has a D.C. component such that its sync tips are clamped at ground plus an offset voltage determined by the $V_{be}$ of transistors 52 and 55 and the relative magnitude of resistors 53 and 56 minus the conduction voltage of diode 62. This clamping of the feedback signal provides D.C. restoration of D.C. reinsertion in the output signal and is determined solely by the scene content as is desired. The D.C. restoration/reinsertion as provided by video processing stage 50 is essentially independent of the B+ operating voltage and is relatively insensitive to component tolerances or temperature drift.

Typical waveforms obtained with the circuit arrangement of FIG. 1 are shown in FIGS. 2 and 3. FIG. 2a illustrates a portion of a typical video signal as transmitted, the synchronizing portion of the waveform being referenced to a voltage level "$V_{REF}$" with black level a predetermined signal level above the blanking pedestal whih is referred to as the blacker-than-black signal level. Picture content detail is shown (in exaggerated form for clarity) as extending from black level to a predetermined level established for an all white scene called the white level. The waveform of FIG. 2a also shows a D.C. component corresponding to the average of D.C. voltage of the waveform relative to the level "$V_{REF}$". This D.C. component represents the relative background brightness level of the image being transmitted. As such, it is desired that this average brightness level component be maintained for effective image reproduction at the image reproducer (kinescope) of the television receiver. However, as in the case of the amplifier of FIG. 1, the signal processing stages are interconnected by A.C. coupling devices such that the D.C. background brightness level component may be modified or lost. This loss of the D.C. component is illustrated in FIG. 2b, which shows the identical waveform of FIG. 2a after processing through an A.C. coupling device such as the capacitor 51 of FIG. 1 without D.C. restoration. The waveform has now lost its D.C. brightness component as indicated by the location of the zero voltage axis. In FIG. 3a, the detail of the scene content portion of the waveform of FIG. 2a has been shown in time sequence at levels corresponding to (1) all white, (2) all black, and (3) one-half white, one-half black scenes to more clearly illustrate the operation of video processing stage 50. As shown in FIG. 3b, the signal waveforms of FIG. 3a when A.C. coupled by a device such as capacitor 51, in the absence of appropriate D.C. restoration, will be represented by shades of grey level in the areas where the scenes should be represented by predominantly all white or all black. In that portion of the scene which is one-half white, one-half black, the white area will also appear grey while the black area will be blacker-than-black. FIG. 3c shows the effect of a reinsertion of the D.C. component in accordance with the circuit arrangement of video processing stage 50 for the three different scene contents as illustrated in FIG. 3a. The D.C. component of voltage $V_0$ during each signal portion as shown in FIG. 3c is representative of the D.C. value of that portion of the scene content. In the illustrated circuit of FIG. 1, for example, the D.C. component of voltage $V_2$ differs from the D.C. component of voltage $V_1$ due to a small voltage drop across resistor 63, whereas the voltage $V_0$ differs from the voltage $V_1$ by an amount determined by the $V_{be}$ of transistors 52 and 55 and relative magnitude of resistors 53 and 56.

In some applications it is desirable to minimize this offset. This can readily be accomplished by the addition of the bias network as illustrated by resistors 64 and 65. Resistors 64 and 65 are chosen to insert a small bias voltage equal to the offset as well as to adjust the D.C. gain of the video processing stage 50 more precisely to unity. It is also possible to adjust the gain to slightly more than unity if such is desirable for signal processing.

It should also be noted that A.C. signal currents through resistor 63 may tend to make the input impedance of video processing stage 50 negative. This tendency can be counteracted by the addition of a resistor 66 as shown, resulting in an input impedance which is high and either positive or negative. Alternatively, the equivalent of resistor 66 may be incorporated in the external video source 40 and the output of video detector 20. Due to the feedback network 53,58, and 59 and to the fact that normally low impedance video sources are used, the output impedance of video processing stage 50 is relatively low (of the order of 100ω in the illustrated embodiment constructed with the component values noted in the accompanying table of components).

The following parameters may be employed in a circuit as shown in FIG. 1:

| | | |
|---|---|---|
| Transistors | 52 — | RCA Part No. 1473620-1 |
| | 55 — | RCA Part No. 1417309-1 |
| Diode | 62 — | RCA Part No. 1471872-6 |
| Resistors | 53 — | 6.8K |
| | 54 — | 1.5K |
| | 56 — | 2.0K |
| | 57 — | 1.0K |
| | 58 — | 1.0K |
| | 61 — | 82K |
| | 63 — | 150K |
| | 64 — | 150K |
| | 65 — | 82K |
| Capacitors | 51 — | 1.2μF |
| | 59 — | 15μF |
| | 60 — | 0.01μF |
| B+ | | 30 volts |

In summary, a video processing amplifier as illustrated provides a signal translating stage with a relatively high input impedance and a relatively low output impedance. The A.C. gain is readily adjustable by means of the A.C. feedback network ($R_{53}, R_{58}, C_{59}$), without significantly affecting the D.C. gain of unity which is desired for D.C. restoration/insertion. The D.C. restoration is determined by the D.C. scene content and is relatively independent of B+ level or power supply fluctuations. Further, the clamp output voltage $V_1$ is loaded only by the relatively high input impedance of the amplifier while being driven by the relatively low output impedance at the amplifier output terminal, thus providing a low drain on the clamp circuit to minimize distortion of the sync tips as well as to minimize the size of the clamp coupling capacitor 60. A still further advantage of the video processing amplifier as illustrated lies in the relative ease with which any desired sync tip level may be established, i.e., a separate bias voltage at the ground reference terminal of resistor 61 and diode 62 will provide the desired sync tip level voltage for applications in which a sync tip level other than ground is desired.

What is claimed is:

1. A video amplifier, comprising:

amplifying means having an input terminal, a feedback terminal, an output terminal and a direct current coupling between said input terminal and said output terminal;

negative feedback means coupled between said output terminal and said feedback terminal for coupling a first predetermined portion of an alternating current component of said output signal and a second predetermined portion, independent of said first predetermined portion, of a direct current component of said output signal to said feedback terminal, said amplifier means having a relatively high open loop gain such that the respective D.C. and A.C. closed loop gains of the combination of said amplifying means and said feedback means is substantially determined by said feedback means;

a source of video signals having video information disposed between synchronization pulses;

first capacitive means for coupling said source of video signals to said input terminal;

means for clamping maximum signal excursions in the direction of said synchronization pulses to a reference voltage, said clamping means including a source of reference voltage and a series connection of a second capacitive means and a unidirectional coupling device, poled to conduct in response to said synchronizing pulses, directly connected between said output terminal and said source of reference voltage; and means for direct current coupling signals developed at the junction of said second capacitive means and said unidirectional coupling device to said input terminal with the same polarity as said input signals to develop at said input terminal a direct voltage substantially equal to the average voltage of said output signal when said synchronizing pulses are clamped to said reference voltage.

2. A video amplifier according to claim 1 wherein said first predetermined portion is less than 100% and wherein said second predetermined portion is substantially equal to 100%.

3. A video amplifier according to claim 1 wherein bias means are provided for coupling a direct voltage to said input terminal to compensate for direct offset voltages developed by said amplifying means and said clamping means.

4. A video amplifier according to claim 3 wherein said bias means are coupled to said feedback means.

5. A video amplifier according to claim 2 wherein said feedback means includes first resistive means coupled between said output terminal and said feedback terminal and a series connection of second resistive means and third capacitive means coupled between said feedback terminal and a point of fixed voltage.

6. A video amplifier according to claim 1 wherein said amplifier means includes first and second transistors of opposite conductivity type each having collector, emitter and base electrodes, said base electrode of said first transistor being coupled to said input terminal, said collector electrode of said first transistor being direct current coupled to the base of said second transistor, said collector of said second transistor being direct current coupled to said output terminal; said feedback means being coupled between said output terminal and said emitter of said first transistor.

7. A video amplifier according to claim 6 wherein said feedback means includes first resistive means direct current coupled between said output terminal and said emitter of said first transistor; and a series connection including second resistive means and third capacitive means coupled between the emitter of said first transistor and a point of fixed voltage.

8. A video amplifier according to claim 6 wherein bias means are provided for coupling a direct voltage to said input terminal to compensate for direct offset voltages developed by said amplifying means and said clamping means.

9. A video amplifier according to claim 8 wherein said bias means are coupled to said feedback means.

10. A video amplifier according to claim 9 wherein said bias means includes a resistive divider coupled between different points of fixed voltage having a tap coupled to said emitter of said first transistor.

11. A video amplifier, comprising a source of video signals including information bearing signals disposed between synchronizing pulses;

an input terminal;
an output terminal;
first capacitive means for coupling said video signals to said input terminal;
first and second transistors of opposite conductivity types each having collector, emitter and base electrodes, the base of said first transistor being direct current coupled to said input terminal, the collector of said second transistor being direct current coupled to the base of said second transistor, the collector of said second transistor being direct current coupled to said output terminal;
a source of reference voltage;
a direct series connection of second capacitive means and a unidirectional coupling device directly connected between said output terminal and said source of reference voltage, said unidirectional coupling device being poled to conduct for signals in the direction of said synchronizing pulses;
means for coupling the signal developed at the junction of said second capacitive means and said unidirectional coupling device to said input terminal to develop at said input terminal a direct voltage substantially equal to the average value of the voltage developed at the junction of said second capacitive means and said unidirectional coupling device;
first resistive means coupled between said output terminal and the emitter of said first transistor; and
second resistive means and third capacitive means coupled in series between the emitter of said first transistor and a point of fixed voltage.

* * * * *